US011121408B2

(12) United States Patent
Hovland (10) Patent No.: US 11,121,408 B2
(45) Date of Patent: Sep. 14, 2021

(54) LITHIUM-ION BATTERY

(71) Applicant: Medtronic, Inc., Minneapolis, MN (US)

(72) Inventor: Erik Hovland, Minnetonka, MN (US)

(73) Assignee: Medtronic, Inc., Minneapolis, MN (US)

( * ) Notice: Subject to any disclaimer, the term of this patent is extended or adjusted under 35 U.S.C. 154(b) by 173 days.

(21) Appl. No.: 16/353,118

(22) Filed: Mar. 14, 2019

(65) Prior Publication Data

US 2020/0295406 A1     Sep. 17, 2020

(51) Int. Cl.
| | |
|---|---|
| *H01M 10/0585* | (2010.01) |
| *H01M 10/0525* | (2010.01) |
| *H01M 2/02* | (2006.01) |
| *H01M 2/10* | (2006.01) |
| *H01M 2/26* | (2006.01) |
| *H01M 50/20* | (2021.01) |
| *H01M 50/40* | (2021.01) |
| *H01M 50/116* | (2021.01) |
| *H01M 50/531* | (2021.01) |

(52) U.S. Cl.
CPC ... *H01M 10/0585* (2013.01); *H01M 10/0525* (2013.01); *H01M 50/116* (2021.01); *H01M 50/20* (2021.01); *H01M 50/40* (2021.01); *H01M 50/531* (2021.01)

(58) Field of Classification Search
CPC ......... H01M 10/0585; H01M 10/0525; H01M 2/14; H01M 2/1016; H01M 2/0277; H01M 2/26
See application file for complete search history.

(56) References Cited

U.S. PATENT DOCUMENTS

| | | | |
|---|---|---|---|
| 9,515,319 B2 | 12/2016 | Harada et al. | |
| 9,537,184 B2 | 1/2017 | Takahashi et al. | |
| 9,543,570 B2 | 1/2017 | Morishima et al. | |
| 9,543,614 B2 | 1/2017 | Sasakawa et al. | |
| 9,543,615 B2 | 1/2017 | Inagaki et al. | |
| 9,548,495 B2 | 1/2017 | Kano et al. | |
| 9,553,331 B2 | 1/2017 | Harada et al. | |
| 9,601,734 B2 | 3/2017 | Ishii et al. | |
| 9,601,749 B2 | 3/2017 | Harada et al. | |
| 9,608,255 B2 | 3/2017 | Takami et al. | |
| 9,614,194 B2 | 4/2017 | Murata et al. | |
| 9,620,757 B2 | 4/2017 | Kano et al. | |
| 9,627,658 B2 | 4/2017 | Takenouchi et al. | |
| 9,627,715 B2 | 4/2017 | Yamamoto et al. | |
| 9,634,310 B2 | 4/2017 | Tokuno et al. | |
| 9,647,252 B2 | 5/2017 | Saruwatari et al. | |
| 9,673,440 B2 | 6/2017 | Ishii et al. | |
| 9,692,042 B2 | 6/2017 | Kuriyama et al. | |
| 9,698,411 B2 | 7/2017 | Yamamoto et al. | |
| 9,698,415 B2 | 7/2017 | Takami et al. | |
| 9,698,422 B2 | 7/2017 | Inagaki et al. | |
| 9,698,446 B2 | 7/2017 | Hoshina et al. | |
| 9,705,155 B2 | 7/2017 | Hoshina et al. | |
| 9,711,782 B2 | 7/2017 | Yoshikawa et al. | |
| 9,722,239 B2 | 8/2017 | Ishibashi et al. | |
| 9,728,778 B2 | 8/2017 | Harada et al. | |
| 9,728,809 B2 | 8/2017 | Inagaki et al. | |
| 9,735,417 B2 | 8/2017 | Hoshina et al. | |
| 9,755,233 B2 | 9/2017 | Sasakawa et al. | |
| 9,774,030 B2 | 9/2017 | Matsuno et al. | |
| 9,774,032 B2 | 9/2017 | Inagaki et al. | |
| 9,780,378 B2 | 10/2017 | Yamamoto et al. | |
| 9,786,909 B2 | 10/2017 | Saruwatari et al. | |
| 9,806,339 B2 | 10/2017 | Nakahara et al. | |
| 9,806,340 B2 | 10/2017 | Takami et al. | |
| 9,812,675 B2 | 11/2017 | Shimizu et al. | |
| 9,812,704 B2 | 11/2017 | Inagaki et al. | |
| 9,825,330 B2 | 11/2017 | Kuriyama et al. | |
| 9,831,492 B2 | 11/2017 | Matsuno et al. | |
| 9,843,044 B2 | 12/2017 | Saruwatari et al. | |
| 9,859,536 B2 | 1/2018 | Isozaki et al. | |
| 9,882,213 B2 | 1/2018 | Takami et al. | |
| 9,893,349 B2 | 2/2018 | Ise et al. | |
| 9,893,377 B2 | 2/2018 | Ishii et al. | |
| 9,923,203 B2 | 3/2018 | Hoshina et al. | |
| 9,929,434 B2 | 3/2018 | Hoshina et al. | |
| 9,947,923 B2 | 4/2018 | Kuriyama et al. | |
| 9,954,261 B2 | 4/2018 | Kuboki et al. | |
| 9,979,020 B2 | 5/2018 | Saruwatari et al. | |
| 10,003,073 B2 | 6/2018 | Kuriyama et al. | |
| 10,020,503 B2 | 7/2018 | Inagaki et al. | |
| 10,020,504 B2 | 7/2018 | Harada et al. | |
| 10,020,505 B2 | 7/2018 | Harada et al. | |
| 10,020,539 B2 | 7/2018 | Kishi et al. | |

(Continued)

FOREIGN PATENT DOCUMENTS

| | | |
|---|---|---|
| EP | 2975679 | 1/2016 |
| EP | 3145000 | 3/2017 |

OTHER PUBLICATIONS

US 10,790,543 B2, 09/2020, Hotta et al. (withdrawn)

*Primary Examiner* — Muhammad S Siddiquee
(74) *Attorney, Agent, or Firm* — Mueting Raasch Group (57) ABSTRACT

Some examples include a lithium-ion battery including an electrode assembly, a battery case, and an insulator. The electrode assembly includes a plurality of stacked electrodes. The battery case includes a cover and a housing. The housing includes a bottom, a perimeter side, and an open top. The cover is configured to extend across the open top. The cover and the housing form an interior enclosure to house the electrode assemble with the cover and the housing sealingly coupled at the lip. The insulator includes a body and a profiled portion. The body being generally planar and the profiled portion extending from the body at an angle. The body is disposed between the electrode assembly and the cover of the battery case. The profiled portion extends between the electrode assembly and the lip of the housing. The insulator is to provide a barrier between the electrode assembly and the sealed lip.

14 Claims, 7 Drawing Sheets

(56) References Cited

U.S. PATENT DOCUMENTS

| | | | |
|---|---|---|---|
| 10,050,266 | B2 | 8/2018 | Hoshina et al. |
| 10,056,615 | B2 | 8/2018 | Ise et al. |
| 10,079,390 | B2 | 9/2018 | Matsuno et al. |
| 10,084,180 | B2 | 9/2018 | Harada et al. |
| 10,096,823 | B2 | 10/2018 | Harada et al. |
| 10,096,826 | B2 | 10/2018 | Ise et al. |
| 10,096,828 | B2 | 10/2018 | Inagaki et al. |
| 10,096,833 | B2 | 10/2018 | Hoshina et al. |
| 10,115,937 | B2 | 10/2018 | Ishii et al. |
| 10,128,506 | B2 | 11/2018 | Kondo et al. |
| 10,135,050 | B2 | 11/2018 | Uematsu et al. |
| 10,141,575 | B2 | 11/2018 | Yamashita et al. |
| 10,170,761 | B2 | 1/2019 | Ise et al. |
| 10,193,149 | B2 | 1/2019 | Harada et al. |
| 10,193,195 | B2 | 1/2019 | Morita et al. |
| 10,199,636 | B2 | 2/2019 | Iwasaki et al. |
| 10,199,648 | B2 | 2/2019 | Hoshina et al. |
| 10,217,995 | B2 | 2/2019 | Inagaki et al. |
| 10,218,005 | B2 | 2/2019 | Ise et al. |
| 10,218,030 | B2 | 2/2019 | Iwasaki et al. |
| 10,224,542 | B2 | 3/2019 | Inagaki et al. |
| 10,224,545 | B2 | 3/2019 | Harada et al. |
| 10,230,098 | B2 | 3/2019 | Inagaki et al. |
| 10,230,102 | B2 | 3/2019 | Sasakawa et al. |
| 10,236,501 | B2 | 3/2019 | Takami et al. |
| 10,256,465 | B2 | 4/2019 | Harada et al. |
| 10,283,747 | B2 | 5/2019 | Isozaki et al. |
| 10,283,776 | B2 | 5/2019 | Sasaki et al. |
| 10,305,102 | B2 | 5/2019 | Harada et al. |
| 10,305,106 | B2 | 5/2019 | Hoshina et al. |
| 10,305,146 | B2 | 5/2019 | Yoshima et al. |
| 10,312,511 | B2 | 6/2019 | Harada et al. |
| 10,326,129 | B2 | 6/2019 | Fukasawa et al. |
| 10,326,140 | B2 | 6/2019 | Yamashita et al. |
| 10,326,141 | B2 | 6/2019 | Isozaki et al. |
| 10,340,511 | B2 | 7/2019 | Iwasaki et al. |
| 10,347,906 | B2 | 7/2019 | Ise et al. |
| 10,355,273 | B2 | 7/2019 | Kuriyama et al. |
| 10,355,274 | B2 | 7/2019 | Yoshida et al. |
| 10,355,318 | B2 | 7/2019 | Hoshina et al. |
| 10,361,429 | B2 | 7/2019 | Ise et al. |
| 10,361,430 | B2 | 7/2019 | Ise et al. |
| 10,374,220 | B2 | 8/2019 | Yoshikawa et al. |
| 10,388,981 | B2 | 8/2019 | Yoshima et al. |
| 10,396,331 | B2 | 8/2019 | Yoshima et al. |
| 10,411,250 | B2 | 9/2019 | Hoshina et al. |
| 10,411,256 | B2 | 9/2019 | Zhang et al. |
| 10,418,612 | B2 | 9/2019 | Shinoda et al. |
| 10,424,818 | B2 | 9/2019 | Takami et al. |
| 10,439,218 | B2 | 10/2019 | Tejima et al. |
| 10,439,226 | B2 | 10/2019 | Yamashita et al. |
| 10,446,829 | B2 | 10/2019 | Namiki et al. |
| 10,446,841 | B2 | 10/2019 | Yasuda et al. |
| 10,454,085 | B2 | 10/2019 | Tanaka et al. |
| 10,461,313 | B2 | 10/2019 | Takami et al. |
| 10,461,314 | B2 | 10/2019 | Shikota et al. |
| 10,461,370 | B2 | 10/2019 | Hotta et al. |
| 10,461,375 | B2 | 10/2019 | Yoshima et al. |
| 10,468,679 | B2 | 11/2019 | Yamamoto et al. |
| 10,483,524 | B2 | 11/2019 | Saruwatari et al. |
| 10,483,526 | B2 | 11/2019 | Takami et al. |
| 10,490,808 | B2 | 11/2019 | Matsuno et al. |
| 10,490,813 | B2 | 11/2019 | Harada et al. |
| 10,505,177 | B2 | 12/2019 | Hoshina et al. |
| 10,505,186 | B2 | 12/2019 | Harada et al. |
| 10,505,223 | B2 | 12/2019 | Yoshima et al. |
| 10,505,233 | B2 | 12/2019 | Murashi et al. |
| 10,511,014 | B2 | 12/2019 | Harada et al. |
| 10,516,163 | B2 | 12/2019 | Harada et al. |
| 10,541,398 | B2 | 1/2020 | Saruwatari et al. |
| 10,541,442 | B2 | 1/2020 | Iwasaki et al. |
| 10,547,054 | B2 | 1/2020 | Harada et al. |
| 10,553,867 | B2 | 2/2020 | Harada et al. |
| 10,553,868 | B2 | 2/2020 | Takami et al. |
| 10,553,894 | B2 | 2/2020 | Sugizaki et al. |
| 10,559,814 | B2 | 2/2020 | Hagiwara et al. |
| 10,559,820 | B2 | 2/2020 | Kishi et al. |
| 10,559,843 | B2 | 2/2020 | Sasakawa et al. |
| 10,559,848 | B2 | 2/2020 | Takami et al. |
| 10,559,854 | B2 | 2/2020 | Takami et al. |
| 10,608,250 | B2 | 3/2020 | Ise et al. |
| 10,629,901 | B2 | 4/2020 | Ise et al. |
| 10,629,952 | B2 | 4/2020 | Kishi et al. |
| 10,651,466 | B2 | 5/2020 | Harada et al. |
| 10,673,103 | B2 | 6/2020 | Hoshina et al. |
| 10,700,350 | B2 | 6/2020 | Takami et al. |
| 10,720,667 | B2 | 7/2020 | Takami et al. |
| 10,727,540 | B2 | 7/2020 | Takami et al. |
| 10,741,830 | B2 | 8/2020 | Ise et al. |
| 10,749,169 | B2 | 8/2020 | Harada et al. |
| 10,756,349 | B2 | 8/2020 | Seki et al. |
| 10,756,392 | B2 | 8/2020 | Seki et al. |
| 10,777,820 | B2 | 9/2020 | Yoshima et al. |
| 10,790,553 | B2 | 9/2020 | Okabe et al. |
| 2003/0040781 | A1 | 2/2003 | Larson et al. |
| 2008/0020279 | A1 | 1/2008 | Schmidt et al. |
| 2013/0266844 | A1 | 10/2013 | Aamodt et al. |
| 2014/0295289 | A1 | 10/2014 | Takami et al. |
| 2015/0010820 | A1 | 1/2015 | Takami et al. |
| 2015/0086811 | A1 | 3/2015 | Takami et al. |
| 2016/0036040 | A1 | 2/2016 | Takami et al. |
| 2016/0036048 | A1 | 2/2016 | Naito et al. |
| 2016/0240849 | A1 | 8/2016 | Kuriyama et al. |
| 2016/0276652 | A1 | 9/2016 | Iwasaki et al. |
| 2016/0276663 | A1 | 9/2016 | Yoshida et al. |
| 2016/0285111 | A1 | 9/2016 | Norton et al. |
| 2017/0005322 | A1 | 1/2017 | Harada et al. |
| 2017/0018797 | A1 | 1/2017 | Murashi et al. |
| 2017/0018807 | A1 | 1/2017 | Kishi et al. |
| 2017/0025723 | A1 | 1/2017 | Isozaki et al. |
| 2017/0062817 | A1 | 3/2017 | Inagaki et al. |
| 2017/0069888 | A1 | 3/2017 | Uchida et al. |
| 2017/0069910 | A1 | 3/2017 | Harada et al. |
| 2017/0077499 | A1 | 3/2017 | Hoshina et al. |
| 2017/0077504 | A1 | 3/2017 | Ise et al. |
| 2017/0077508 | A1 | 3/2017 | Hoshina et al. |
| 2017/0077509 | A1 | 3/2017 | Ise et al. |
| 2017/0077510 | A1 | 3/2017 | Zhang et al. |
| 2017/0077511 | A1 | 3/2017 | Harada et al. |
| 2017/0077512 | A1 | 3/2017 | Harada et al. |
| 2017/0077515 | A1 | 3/2017 | Kondo et al. |
| 2017/0077547 | A1 | 3/2017 | Takami et al. |
| 2017/0077551 | A1 | 3/2017 | Kishi et al. |
| 2017/0092942 | A1 | 3/2017 | Fukasawa et al. |
| 2017/0110723 | A1 | 4/2017 | Ishibashi et al. |
| 2017/0141390 | A1 | 5/2017 | Harada et al. |
| 2017/0141433 | A1 | 5/2017 | Yoshima et al. |
| 2017/0162872 | A1 | 6/2017 | Takami et al. |
| 2017/0170469 | A1 | 6/2017 | Inagaki et al. |
| 2017/0179483 | A1 | 6/2017 | Kuriyama et al. |
| 2017/0179486 | A1 | 6/2017 | Saruwatari et al. |
| 2017/0179493 | A1 | 6/2017 | Yoshima et al. |
| 2017/0179535 | A1 | 6/2017 | Murashi et al. |
| 2017/0187022 | A1 | 6/2017 | Isozaki et al. |
| 2017/0222272 | A1 | 8/2017 | Takami et al. |
| 2017/0237068 | A1 | 8/2017 | Inagaki et al. |
| 2017/0271639 | A1 | 9/2017 | Yoshima et al. |
| 2017/0271661 | A1 | 9/2017 | Yasuda et al. |
| 2017/0271662 | A1 | 9/2017 | Harada et al. |
| 2017/0271663 | A1 | 9/2017 | Hoshina et al. |
| 2017/0271664 | A1 | 9/2017 | Harada et al. |
| 2017/0271665 | A1 | 9/2017 | Harada et al. |
| 2017/0271666 | A1 | 9/2017 | Kishi et al. |
| 2017/0271667 | A1 | 9/2017 | Yoshida et al. |
| 2017/0271668 | A1 | 9/2017 | Hoshina et al. |
| 2017/0271675 | A1 | 9/2017 | Yamashita et al. |
| 2017/0271707 | A1 | 9/2017 | Sasakawa et al. |
| 2017/0271708 | A1 | 9/2017 | Yoshima et al. |
| 2017/0271717 | A1 | 9/2017 | Yamashita et al. |
| 2017/0271719 | A1 | 9/2017 | Hoshina et al. |
| 2017/0271720 | A1 | 9/2017 | Hoshina et al. |
| 2017/0294657 | A1 | 10/2017 | Yamashita et al. |
| 2017/0365842 | A1 | 12/2017 | Hoshina et al. |
| 2017/0365846 | A1 | 12/2017 | Yasuda et al. |

(56) References Cited

U.S. PATENT DOCUMENTS

| | | |
|---|---|---|
| 2017/0365857 A1 | 12/2017 | Isozaki et al. |
| 2017/0365886 A1 | 12/2017 | Hoshina et al. |
| 2018/0006338 A1 | 1/2018 | Sasakawa et al. |
| 2018/0026260 A1 | 1/2018 | Hoshina et al. |
| 2018/0034026 A1 | 2/2018 | Tanaka et al. |
| 2018/0083252 A1 | 3/2018 | Yoshima et al. |
| 2018/0083269 A1 | 3/2018 | Iwasaki et al. |
| 2018/0083279 A1 | 3/2018 | Takami et al. |
| 2018/0083284 A1 | 3/2018 | Yamashita et al. |
| 2018/0083286 A1 | 3/2018 | Ise et al. |
| 2018/0083310 A1 | 3/2018 | Iwasaki et al. |
| 2018/0123112 A1* | 5/2018 | Dai ................ H01M 2/361 |
| 2018/0123127 A1 | 5/2018 | Harada et al. |
| 2018/0138463 A1* | 5/2018 | Bruch .............. H01M 2/266 |
| 2018/0159119 A1 | 6/2018 | Matsuno et al. |
| 2018/0183056 A1 | 6/2018 | Takami et al. |
| 2018/0219189 A1 | 8/2018 | Nielsen et al. |
| 2018/0219195 A1 | 8/2018 | Enomoto et al. |
| 2018/0241083 A1 | 8/2018 | Takami et al. |
| 2018/0248230 A1 | 8/2018 | Noguchi et al. |
| 2018/0248234 A1 | 8/2018 | Okabe et al. |
| 2018/0269534 A1 | 9/2018 | Hotta et al. |
| 2018/0269537 A1 | 9/2018 | Yoshima et al. |
| 2018/0269538 A1 | 9/2018 | Hotta et al. |
| 2018/0269539 A1 | 9/2018 | Sasakawa et al. |
| 2018/0277813 A1 | 9/2018 | Yoshima et al. |
| 2018/0277828 A1 | 9/2018 | Namiki et al. |
| 2018/0277834 A1 | 9/2018 | Harada et al. |
| 2018/0277835 A1 | 9/2018 | Ise et al. |
| 2018/0277882 A1 | 9/2018 | Sugizaki et al. |
| 2018/0277899 A1 | 9/2018 | Takami et al. |
| 2018/0277904 A1 | 9/2018 | Sasakawa et al. |
| 2018/0277905 A1 | 9/2018 | Harada et al. |
| 2018/0277906 A1 | 9/2018 | Yoshima et al. |
| 2018/0277907 A1 | 9/2018 | Iwasaki et al. |
| 2018/0277908 A1 | 9/2018 | Sasakawa et al. |
| 2018/0277909 A1 | 9/2018 | Harada et al. |
| 2018/0301688 A1 | 10/2018 | Kobayashi et al. |
| 2018/0337421 A1 | 11/2018 | Sasakawa et al. |
| 2019/0006659 A1 | 1/2019 | Hagiwara et al. |
| 2019/0067953 A1 | 2/2019 | Sugiyama et al. |
| 2019/0088926 A1 | 3/2019 | Takami et al. |
| 2019/0088927 A1 | 3/2019 | Kusama et al. |
| 2019/0088928 A1 | 3/2019 | Kishi et al. |
| 2019/0088941 A1 | 3/2019 | Harada et al. |
| 2019/0088942 A1 | 3/2019 | Ise et al. |
| 2019/0088982 A1 | 3/2019 | Sugizaki et al. |
| 2019/0088983 A1 | 3/2019 | Namiki et al. |
| 2019/0088984 A1 | 3/2019 | Takami et al. |
| 2019/0088999 A1 | 3/2019 | Sekiguchi et al. |
| 2019/0089009 A1 | 3/2019 | Yoshima et al. |
| 2019/0089010 A1 | 3/2019 | Yamashita et al. |
| 2019/0089011 A1 | 3/2019 | Seki et al. |
| 2019/0089012 A1 | 3/2019 | Hotta et al. |
| 2019/0097202 A1 | 3/2019 | Morone et al. |
| 2019/0140220 A1* | 5/2019 | Jiang .................... H01M 2/028 |
| 2019/0173121 A1 | 6/2019 | Yamamoto et al. |
| 2019/0198871 A1 | 6/2019 | Hoshina et al. |
| 2019/0221834 A1 | 7/2019 | Hara et al. |
| 2019/0245173 A1 | 8/2019 | Namba et al. |
| 2019/0260075 A1 | 8/2019 | Yoshima et al. |
| 2019/0260085 A1 | 8/2019 | Hagiwara et al. |
| 2019/0273235 A1 | 9/2019 | Uematsu et al. |
| 2019/0288283 A1 | 9/2019 | Harada et al. |
| 2019/0288327 A1 | 9/2019 | Yamashita et al. |
| 2019/0288330 A1 | 9/2019 | Sasakawa et al. |
| 2019/0288332 A1 | 9/2019 | Hotta et al. |
| 2019/0288348 A1 | 9/2019 | Fukaya et al. |
| 2019/0296306 A1 | 9/2019 | Sugizaki et al. |
| 2019/0296325 A1 | 9/2019 | Sekiguchl et al. |
| 2019/0296327 A1 | 9/2019 | Ise et al. |
| 2019/0296337 A1 | 9/2019 | Yasuda et al. |
| 2019/0296342 A1 | 9/2019 | Harada et al. |
| 2019/0296343 A1 | 9/2019 | Harada et al. |
| 2019/0296344 A1 | 9/2019 | Seki et al. |
| 2019/0296345 A1 | 9/2019 | Harada et al. |
| 2019/0296346 A1 | 9/2019 | Harada et al. |
| 2019/0296351 A1 | 9/2019 | Yoshima et al. |
| 2019/0296357 A1 | 9/2019 | Seki et al. |
| 2019/0296390 A1 | 9/2019 | Yoshima et al. |
| 2019/0296394 A1 | 9/2019 | Iwasaki et al. |
| 2019/0296400 A1 | 9/2019 | Sekiguchi et al. |
| 2019/0334148 A1 | 10/2019 | Hasegawa et al. |
| 2019/0341605 A1 | 11/2019 | Tanaka et al. |
| 2019/0372154 A1 | 12/2019 | Yamamoto et al. |
| 2020/0006731 A1 | 1/2020 | Tokuno et al. |
| 2020/0006732 A1 | 1/2020 | Yorisaki et al. |
| 2020/0044205 A1 | 2/2020 | Shinoda et al. |
| 2020/0044235 A1 | 2/2020 | Sasakawa et al. |
| 2020/0044247 A1 | 2/2020 | Sasakawa et al. |
| 2020/0083514 A1 | 3/2020 | Enomoto et al. |
| 2020/0091499 A1 | 3/2020 | Yoshima et al. |
| 2020/0091502 A1 | 3/2020 | Harada et al. |
| 2020/0091505 A1 | 3/2020 | Hoshina et al. |
| 2020/0091513 A1 | 3/2020 | Harada et al. |
| 2020/0091560 A1 | 3/2020 | Sasakawa et al. |
| 2020/0124676 A1 | 4/2020 | Tohara et al. |
| 2020/0127322 A1 | 4/2020 | Takami et al. |

* cited by examiner

LITHIUM-ION BATTERY

TECHNICAL FIELD

This disclosure generally relates to the field of batteries and more particularly to lithium-ion batteries.

BACKGROUND

Electrochemical cells in the form of batteries are widely used to power electronic devices. In certain applications, small size, high energy density, and reliable power supply capability are highly desirable. One such application is in medical devices. It can also be highly desirable to include rechargeable lithium-ion batteries in devices, such that the batteries do not have to be removed from and replaced within the device. Furthermore, such power supplies should be reliably sealed to prevent leakage of electrochemical cell material. Sealing of the power supplies can include welding or other processes that can damage the components enclosed within the housing of the power supply.

SUMMARY

Some aspects, in accordance with principles of the present disclosure, relate to a lithium-ion battery including an electrode assembly, a battery case, and an insulator. The electrode assembly includes a plurality of stacked electrodes. The battery case includes a cover and a housing. The housing includes a bottom, a perimeter side, and an open top. The cover is configured to extend across the open top. The cover and the housing form an interior enclosure, or cavity, to house the electrode assembly with the cover and the housing sealingly coupled at the lip. The insulator includes a body and a profiled portion. The body being generally planar and the profiled portion extending from the body at an angle. The body is disposed between the electrode assembly and the cover of the battery case. The profiled portion extends between the electrode assembly and the lip of the housing. The insulator is to provide a barrier between the electrode assembly and the sealed lip Other aspects, in accordance with principles of the present disclosure, relate to a lithium-ion battery including an electrode assembly, a battery case, and an insulator. The electrode assembly includes a plurality of electrodes including positive and negative electrodes alternatingly arranged one atop another in a stack. Each of the plurality of electrodes is generally planar and encased in a separator. The battery case includes a cover and a housing. The housing includes a bottom, a perimeter side terminating at a lip, and an open top. The cover to extend across the open top and engage with the lip. The cover and the housing form an enclosure to house the electrode assembly. The insulator includes a body and a profiled portion. The body being generally planar and the profiled portion extending from the body at an angle. The insulator is assembled within the enclosure of the battery case with the body disposed between the electrode assembly and the cover and the profiled portion extending between the electrode assembly and the perimeter side. The insulator provides a thermal barrier between the electrode assembly and the sealed lip.

Other aspects, in accordance with principles of the present disclosure, relate to a method of assembling a lithium-ion battery including inserting an electrode assembly into an opening of a battery case, the electrode assembly comprising a plurality of stacked plate electrodes. The method also including inserting an insulator over the electrode assembly, the insulator including a body and a profiled portion extending from the body, the body positioned over a top of the electrode assembly, the profiled portion to extend between a perimeter of the electrode assembly and a side of the battery case. The method also including positioning a cover of the battery case over the opening of the battery case, and hermetically sealing the cover to a housing of the battery case to enclose the electrode assembly. The insulator provides a barrier between the electrode assembly during the hermetic sealing of the cover to the housing.

The details of one or more aspects of the disclosure are set forth in the accompanying drawings and the description below. Other features, objects, and advantages of the techniques described in this disclosure will be apparent from the description and drawings, and from the claims.

DETAILED DESCRIPTION

Power supplies, such as lithium-ion batteries, can include one or more positive electrodes, one or more negative electrodes, and an electrolyte provided within a battery case. Separators made from a porous polymer or other suitable material can be provided intermediate or between the positive and negative electrodes to prevent direct contact between adjacent electrodes. When assembled, the separators can interfere with the sealing of the battery case by being inadvertently positioned between a cover and a housing of the battery case during assembly. The separator can thus impede full contact and sealing between the cover and the housing and cause defects in the seal or weld of the battery case and/or cause damage to (e.g., tear) the separator which in turn can cause damage to the electrodes. Even when fully disposed within the interior cavity of the battery case, the thermal damage to the electrode assembly can occur during a welding process used to seal the cover and housing together. Thermal damage to the electrode assembly (or other components) can occur due to being disposed against or closely proximal to the battery case adjacent the weld location, or weld zone, that is heated during welding. Aspects of the present disclosure can provide protection to the electrode assembly during the welding process employed to hermetically seal the cover to the case and form the battery case.

Figure 1:
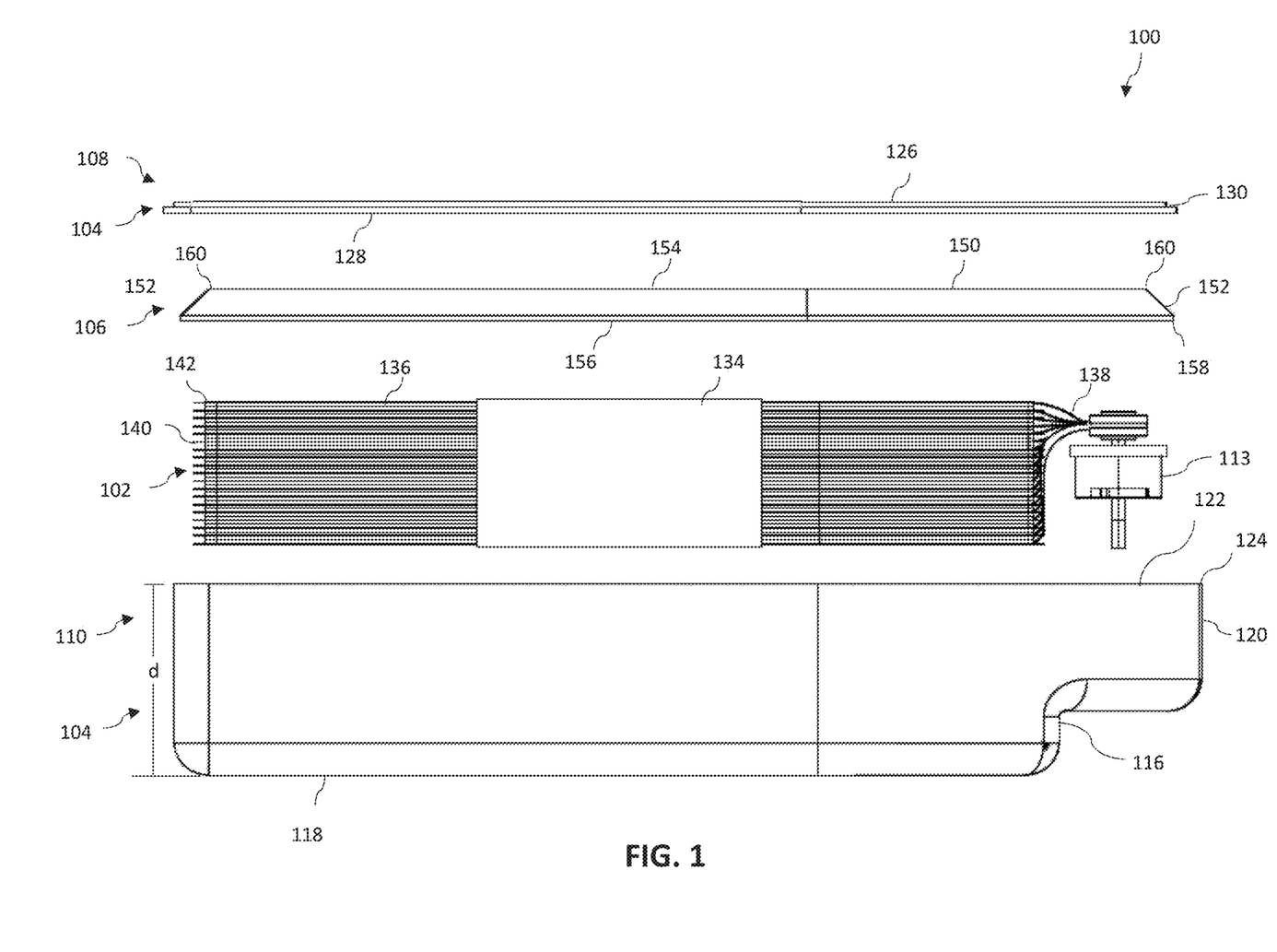
FIG. 1 is an exploded view of an example lithium-ion battery in accordance with aspects of the present disclosure.

FIG. 1 is an exploded view of an example battery 100 in accordance with aspects of the present disclosure. In one example, the battery 100 can be a lithium-ion battery. In one example, the battery 100 can be a rechargeable lithium-ion battery. The battery 100 includes an electrode assembly 102, a battery case 104, and an insulator 106. In general terms, the electrode assembly 102 and the insulator 106 are housed within the battery case 104, as described further below.

The battery 100 will be described further with additional reference to the cross-sectional view of the example assembled battery 100 illustrated in FIG. 2. In one example, the battery case 104 of the battery 100 includes a cover 108 and a housing 110. The cover 108 and the housing 110 of the battery case 104 form an enclosure suitable to contain the electrode assembly 102 and the insulator 106. The cover 108 and the housing 110 can be formed separately and assembled and sealed together after the electrode assembly 102, the insulator 106, and any other desired components are assembled within an interior cavity 112 of the battery case 104. The battery case 104 houses pin assemblies 113 that transfer electrical energy from the electrode assembly 102 to the device begin powered by the battery 100, for example, an implantable medical device. In one example, the battery case 104 can be a shallow drawn hermetic battery case enclosure and the electrode assembly 102 and the insulator 106 can be housed and hermetically sealed within. The term "shallow drawn", in accordance with this disclosure, means having a height less than a width and/or length.

In one example, the housing 110 can include an inner shell, or liner, 110a and an outer shell 110b (see, e.g., FIG. 4), with the inner and outer shells 110a, 110b correspondingly sized and shaped such that the inner shell 110a can be fitted within the outer shell 110b. The housing 110 has an interior surface 114 defining the interior cavity 112 and an exterior surface 116. In one example, the housing 110 can include a first side 118 (e.g., bottom), a perimeter side 120, and an open second side 122 (e.g., top) through which the electrode assembly 102, insulator 106, and other components (as desired, not shown) can be inserted into the interior cavity 112 during assembly. The perimeter side 120 can extend between the first and second sides 118, 122 to define a depth "d" of the battery case 104. The perimeter side 120 of the housing 110 terminates at the open second side 122 to form a lip 124 at the perimeter of the open second side 122. The lip 124 can be formed as part of one or both shells 110a, 110b of the housing 110. The lip 124 can be suitably shaped and sized to receive the cover 108. In one example, the lip 124 can be recessed adjacent the interior cavity 112 to form a ledge that the cover 108 can be disposed against when the cover 108 and housing 110 are assembled together. The lip 124 can be utilized to maintain the cover 108 at the perimeter side 120 across the open second side 122 without allowing the cover 108 to freely drop within the interior cavity 112 of the battery case 104.

Figure 2:
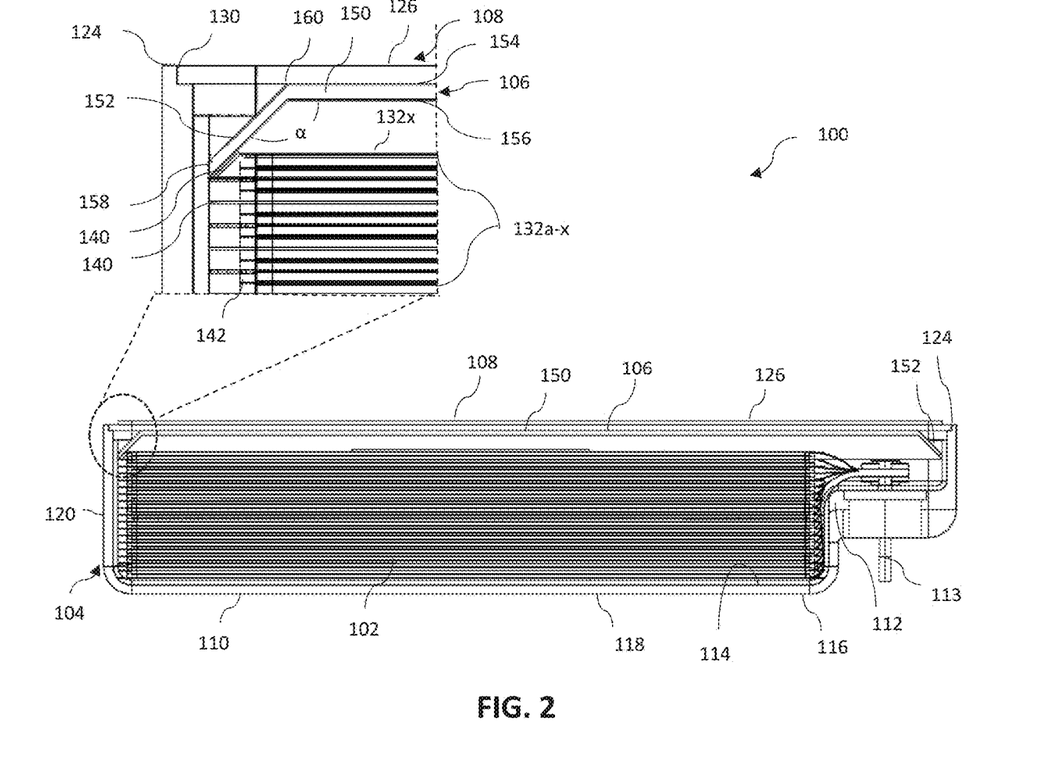
FIG. 2 is a cross-sectional view of the assembled example lithium-ion battery of FIG. 1 in accordance with aspects of the present disclosure.

With continued reference to FIGS. 1 and 2, the cover 112 can extend over the open second side 122 to enclose the interior cavity 112 of the battery case 104. The cover 108 can be sized and shaped to extend fully across the open second side 122 and mate with the housing 110 at the lip 124. The cover 112 includes an outer surface 126, an inner surface 128, and a cover edge 130. The cover 108 has a thickness defined between the inner and outer surfaces 128, 126. In one example, the outer and inner surfaces 126, 128 of the cover 108 are generally planar, as illustrated, although any suitable shape is acceptable. In one example, the cover 108 is sized to extend within the recess formed by the lip 124. The cover 108 can be inset or slightly inset into the housing 110 at the lip 124. The cover edge 130 is sized and shaped with mate with the lip 124 of the housing 110. In one example, the cover edge 130 can be beveled or otherwise shaped to assist with facilitating a hermetic seal of the cover 108 to the housing 110 when welded. The cover 108 can be welded or otherwise sealed to the housing 110 at the lip 120.

In some examples, the welding process is performed by laser welding, however, other methods of attachment are also acceptable. For example, resistance welding, brazing, soldering and other techniques can be employed to couple the cover 108 to the housing 110. The term welding can encompass many types of attachment such as resistance welding and brazing. It is also contemplated that many other types of attachment could be utilized without departing from the spirit of the disclosure. The insulator 106 can provide protection to the electrode assembly 102 and other components during the welding process and reduce the likelihood of a portion of radiation emitted from the laser beam from penetrating the battery case 104 and damaging radiation and heat sensitive components, such as the electrode assembly 102, housed inside, as discussed further below.

The cover 108 and the housing 110 of the battery case 104 can be made of a biologically compatible material such as medical grade titanium, aluminum, or stainless steel, for example. The battery case 104 material is compatible with the chemistry of the cell electrolyte and other materials housed within the battery case 104 in order to prevent corrosion. The battery case 104 can be manufactured from a variety of process including, for example, machining, casting, stamping, milling, three-dimensional (3D) printing, thermoforming, injection molding, vacuum molding, or other suitable process.

Figure 3:
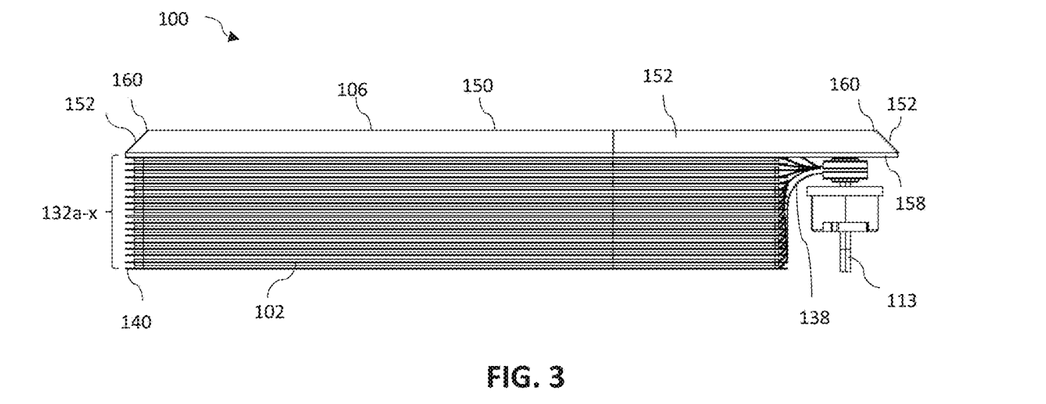
FIG. 3 is a side view of the example lithium-ion battery of FIG. 1 without the battery case in accordance with aspects of the present disclosure.

With additional reference to FIG. 3, the electrode assembly 102 includes a plurality of electrodes 132a-x. The plurality of electrodes 132a-x can be banded together with a band 134 extending around a perimeter of the plurality of electrodes 132a-x to maintain the electrodes in the assembled state. In some examples, the electrode assembly 102 can be slightly compressed when the cover 108 is assembled to the housing 110 of the battery case 104 without damaging the electrodes 132 of the electrode assembly 102. The electrodes 132a-x are assembled to a maximized stack height of the electrode assembly 102 that can be suitably contained within the battery case 104 and provide a maximum energy density of the battery 100. The electrodes 132 can be manufactured to be any suitable shape and contour and can match, or coincide, with the shape and form of the interior cavity 112 of the battery case 104. In one example, the electrodes 132 are laser cut to the desired shape and size. The electrode assembly 102 can have dimensions slightly smaller than the interior cavity 112 of the battery case 104. The electrode assembly 102 is formed to maximize the energy output provided within the battery case 104. In other words, the electrode assembly 102 is formed fill the space as much as allowable in all three spatial dimensions (e.g., height, width, depth).

In one example, the each of the electrodes 132a-x can be generally planar and can be assembled, or stacked, to form a generally planar electrode assembly 102. Each electrode 132 has a generally flat body (e.g., having minimal thickness) and includes a current collector 138, indicated only on the bottom electrode 132a illustrated in FIG. 3 for clarity. The current collector 138 can extend outward from the electrode 132. In one example, the plurality of electrodes 132a-x is assembled by stacking one electrode atop another electrode in an alternating fashion (i.e., alternating positive, negative, positive, negative, etc.) with positive current collector aligned at a first end of the electrode assembly 102 and negative current collector aligned at a second end of the electrode assembly 102 until the desired quantity of electrodes 132 are assembled together to form the electrode assembly 102. In another example, the plurality of electrodes 132a-x can be assembled by stacking the electrodes in an alternating fashion with the positive and negative current collectors oriented at the same (e.g., first) end of the electrode assembly 102.

Each electrode 132 can be encased in a separator 140 with the current collector 138 extending through and outside of the separator 140 to electrically connect. The current collector 138 (e.g., aluminum such as an aluminum foil) can have an active material provided thereon (e.g., $LiCoO_2$). The separator 140 can extend beyond an outer edge 142 of the electrode 132 to sealingly encase the electrode 132. The separator 140 can electrically insulate the adjacently disposed anode electrodes and cathode electrodes. The separator 140 is preferably formed of material that is wettable by cell electrolyte housed or contained within the battery case 104 and sufficiently porous to allow the electrolyte to flow through the material and maintain physical and chemical integrity within the electrode during operation. The separator 140 is formed of a flexible material and can have a thickness of 12 micrometers, for example. Other suitable thicknesses are also acceptable. Examples of suitable materials forming the separator 140 include, but are not limited to, polyethylenetetrafluoroethylene, ceramics, non-woven glass, glass fiber material, polypropylene, and polyethylene.

Figure 4:
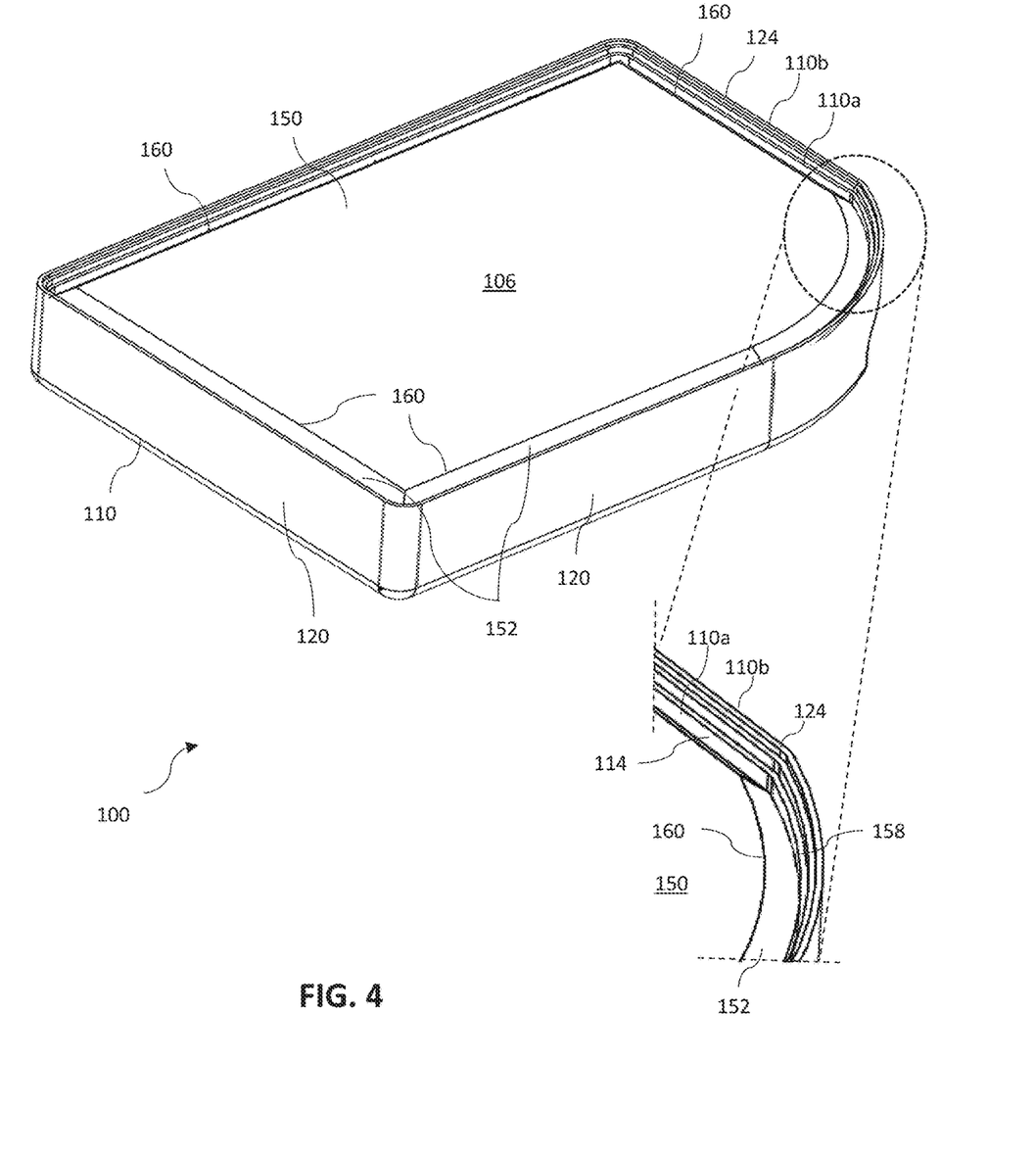
FIG. 4 is a perspective view of the example lithium-ion battery of FIG. 1 without the cover of the battery case in accordance with aspects of the present disclosure.

FIG. 4 is a perspective view of the example lithium-ion battery of FIG. 1 without the cover 108 of the battery case 104 in accordance with aspects of the present disclosure. As illustrated, the insulator 106 is assembled over the electrode assembly 102 (see, e.g., FIG. 2) within the housing 110 of the battery case 104. In one example, the insulator 106 can be formed to correspond to, or compliment, the perimeter side 120 of the battery case 104. The insulator 106 is disposed within the battery case 104 to provide a protective thermal barrier between the electrode assembly 102 and the battery case 104 at the intersection of the cover 108 and the housing 110 (e.g., at the lip 124) during the laser welding procedure that bonds and seals the cover 108 with the housing 110.

With continued reference to FIG. 2, the insulator 106 is conformable to extend between the electrode assembly 102 the cover 108 when the battery 100 is assembled. The insulator 106 has a first surface 154, a second surface 156, and a terminal edge 158. The insulator 106 includes a body 150 and a profiled portion 152 that extends at an angle from the body 150. The body 150 of the insulator 106 can extend between the top surface of the top electrode 132x and the inner surface 128 of the cover 108 of the battery case 104. The insulator 106 is sized and shaped to extend over a top surface of the top electrode 132x. The profiled portion 152 can be positioned over the top and edge of the electrode assembly 102. The profiled portion 152 can be disposed along the perimeter side 120 and adjacent the lip 124. When assembled and fitted within the battery case 104, the profiled portion 152 is disposed at an acute angle with respect to the cover 108. In other words, the profiled portion 152 extends at an acute angle from the cover 108 toward the perimeter side 120 of the housing 110. The profiled portion 152 can extend a distance less than "d" of the housing 110.

The profiled portion 152 can be oriented at an angle downward from the cover 108 (e.g., away from the open second side 122 and toward the first side 118) between the lip 124 and the electrode assembly 102. More particularly, the insulator 106 is assembled with a first surface 154 extending over and contacting the top surface of a top electrode 132x and a second surface 156 opposite the first surface 154 disposed to face and be positioned against the inner surface 128 of the cover 108. The insulator 106 can engage with and reposition (e.g., push) the separator 140 covering the electrodes 132 downward and away from the lip 124 (e.g., the weld zone) such that the separator 140 does not interfere with the welding process sealing the cover 108 with the housing 110. The downward orientation of the profiled portion 152 can engage with and reposition, the separator 140 downward and away from the lip 124 as the insulator 106 is positioned over and a downward force is applied onto the insulator 106 during assembly. The insulator 106 can maximize a distance between the outer edge 142 of the separator 140 encased electrode 132x and the cover 108 and the perimeter side 120 of the housing 110 disposed adjacent the lip 124 within the interior cavity 112 to prevent mechanical and thermal damage during the assembly and sealing of the cover 108 to the housing 110.

The insulator 106 is formed of a sufficiently flexible material that can effectively create a spring-like force against the electrode assembly 102 when force is applied to the insulator 106, such as by the cover 108. The insulator 106 is capable of applying sufficient force against the separator 140 at the outer edge 142 of at least the top electrode 132x to position, or reposition, the separator 140 a distance from the lip 124. The insulator 106 can position the separator 140 at a suitable distance away from the weld to prevent thermal damage to the separation material and/or prevent the separator 140 from impeding full contact and sealing of the cover 108 and the housing 110. In one example, the insulator 106 provides a clearance distance of at least 760 micrometers from the weld to the nearest portion of the insulator 106. Other suitable distances that provide a weld zone suitable to prevent damage to the components are also acceptable.

In one example, the insulator 106 can be formed of Ethylene tetrafluoroethylene (ETFE). ETFE has a relatively high melting temperature, and chemical, electrical and high-energy radiation resistance properties. The insulator 106 can also be formed of polypropylene, polyethylene, or other suitable insulative and corrosion resistant material. The insulator 106 has a thickness suitable to withstand weld temperatures exposed to during the welding process of hermetically sealing the cover 108 to the housing 110 and to transfer and apply suitable force onto the separator 140 to cause movement of the separator. In one example, the insulator 106 has a material thickness that is approximately ten times the thickness of the material forming the separator 140. The insulator 106 can have a thickness of approximately 127 micrometers to approximately 254 micrometers. Other suitable thicknesses are also acceptable and the examples provided are not intended to be limiting.

Figure 5:
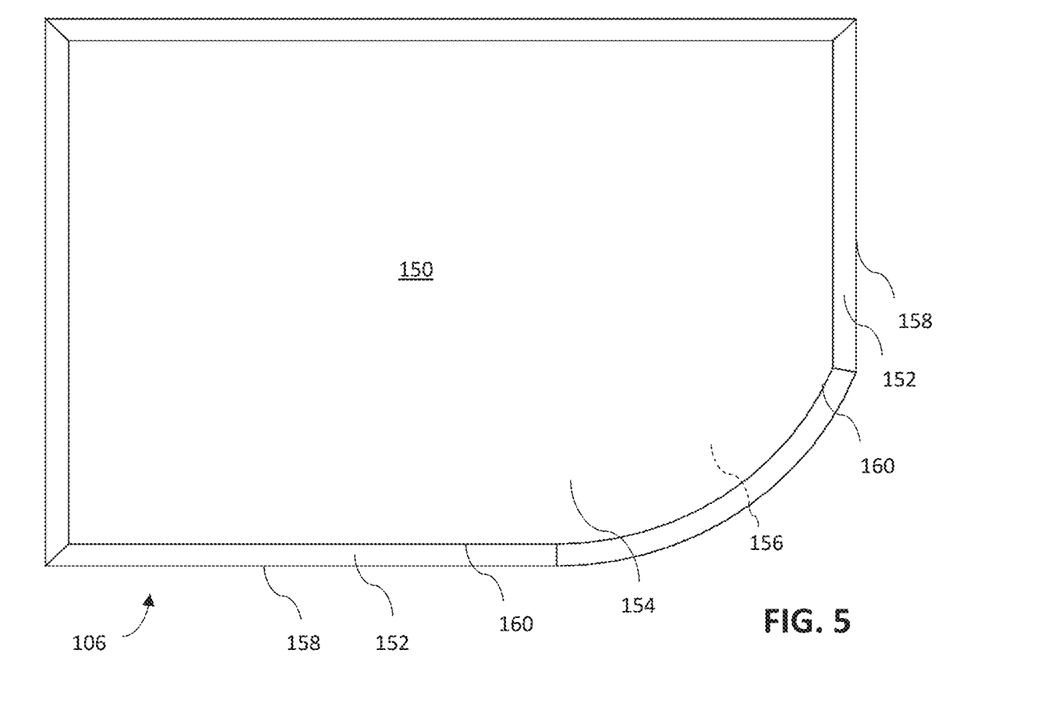
FIG. 5 is a top view of an example insulator useful in the lithium-ion battery of FIG. 1 in accordance with aspects of the present disclosure.
Figure 6:
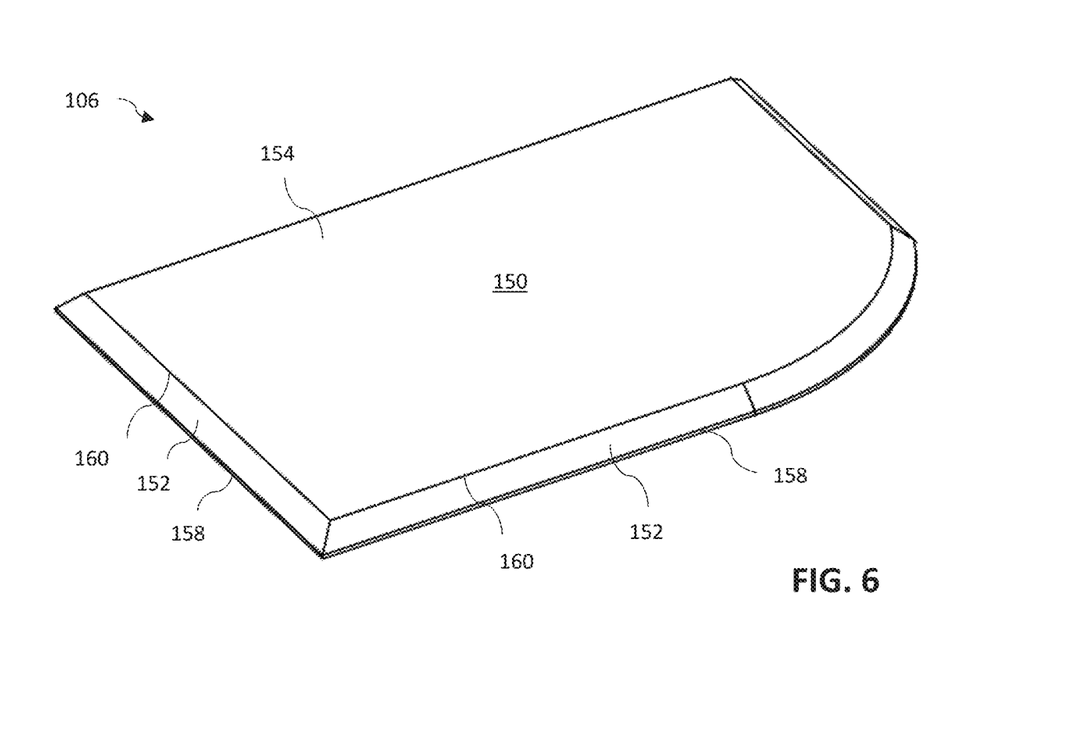
FIG. 6 is a perspective view of an example insulator useful in lithium-ion battery of FIG. 1 in accordance with aspects of the present disclosure.

FIGS. 5 and 6 illustrate top and profile views of the example insulator 106 useful in the battery 100 of FIG. 1 in accordance with aspects of the present disclosure. The profiled portion 152 can extend around an entirety of the body 150 or along select sections or sides of the body 150.

The profiled portion 152 can extend along or coincide with, the perimeter shape of the body 150 (e.g., curved, linear, etc.). In one example, as illustrated in FIG. 5, the profiled portion 152 can be included to be disposed along the interior of the entire perimeter side 120 of the housing 110. In another example, the insulator includes the profiled portion 152 suitable to be disposed along the interior of the perimeter side 120 where the electrode assembly 102 is positioned adjacent to the perimeter side 120 and is not included along sections where the electrode assembly is spaced away from the perimeter side 120, such as at the current collectors 138. The profiled portion 152 can be disposed at an obtuse angle with respect to the body 150. With additional reference to the expanded view of the cross-section of FIG. 2, the profiled portion 152 can be formed to extend at an obtuse angle from the generally planar body 150 along the first surface as indicated with angle, "α". In one example, the angle "α" is formed at a 135 degree (°) angle. In other examples, the angle "α" is formed at 135° to 90°. The profiled portion 152 is adjoined to the body 150 along a bend edge 160. The bend edge 160 is formed at a distance from the terminal edge 158. The insulator 106 can be formed monolithically of a single sheet of material. The insulator 106 can be formed of a sheet of material shaped into a suitable three-dimensional form. The insulator 106 can be thermo-formed into a suitable shape, for example. The insulator 106 can be maintain a formed shape when freely disposed and flex when sufficient force is applied.

Figure 7:
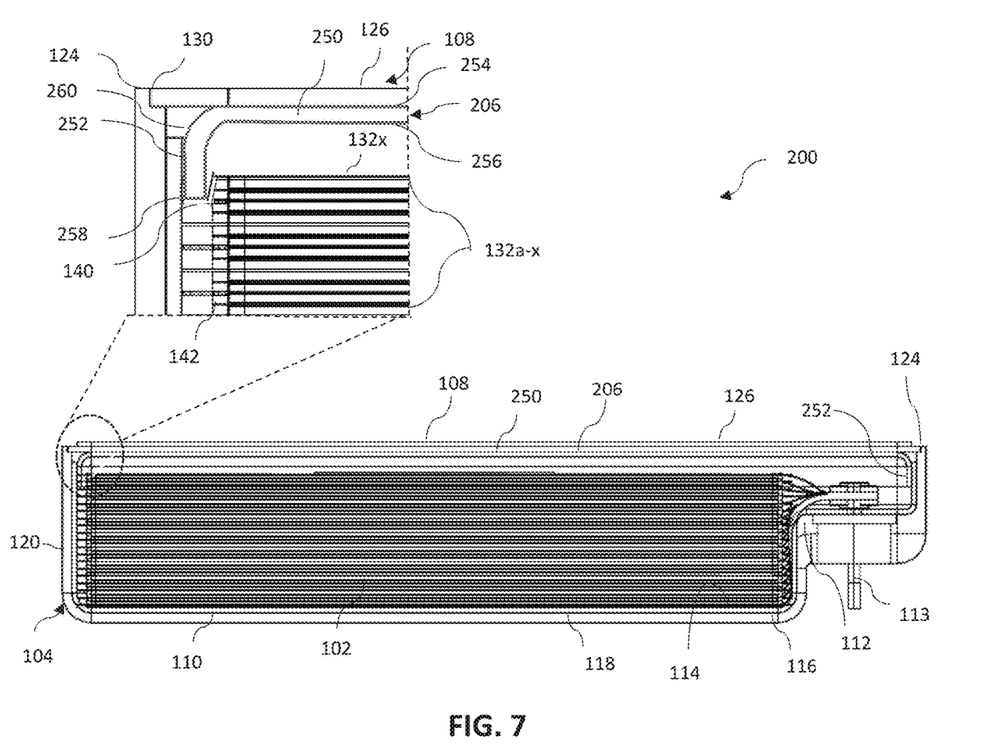
FIG. 7 is a cross-sectional view of the assembled example lithium-ion battery of FIG. 7 in accordance with aspects of the present disclosure.
Figure 8:
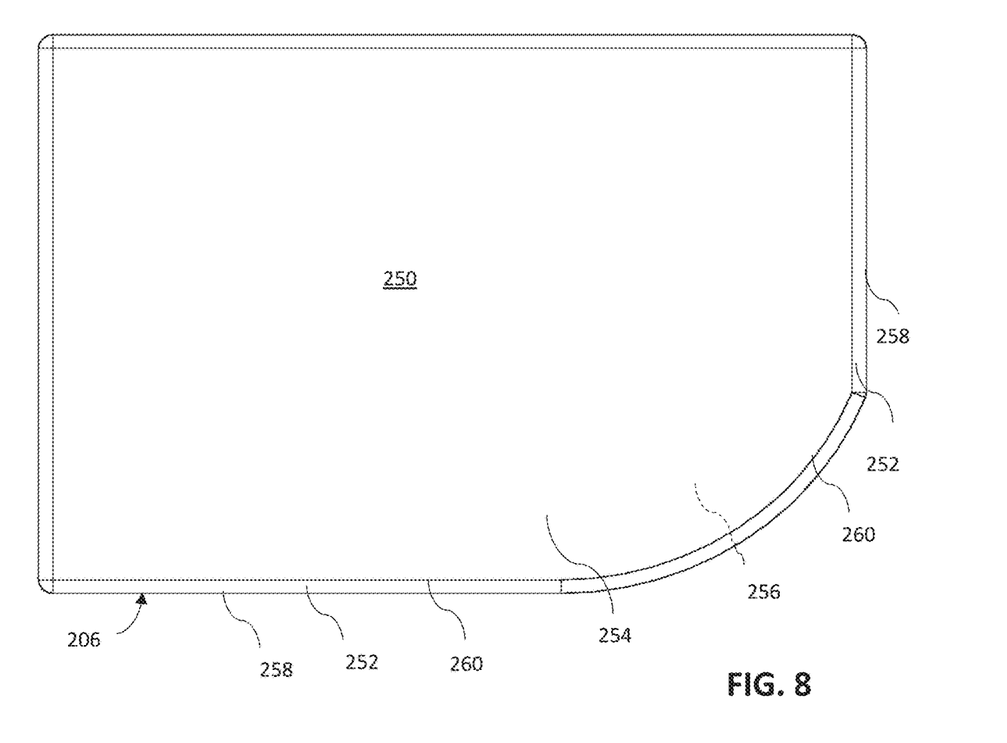
FIG. 8 is a top view of an example insulator useful in the lithium-ion battery of FIG. 7 in accordance with aspects of the present disclosure.

FIG. 7 is a cross-sectional view of another example lithium-ion battery 200 including an insulator 206 in accordance with aspects of the present disclosure. FIG. 8 is an exploded view of the assembled lithium-ion battery 200 including an insulator 206 in accordance with aspects of the present disclosure. Elements of the battery 200 are similar to battery 100 and are similarly numbered and referenced. The battery 200 includes the electrode assembly 102, the battery case 104, and the insulator 206. The electrode assembly 102 and the insulator 206 are housed within the battery case 104. Similar to the insulator 106 described above with respect to FIGS. 1-6, the insulator 206 can be assembled over the electrode assembly 102 within the housing 110 of the battery case 104. The insulator 206 can be disposed within the battery case 104 to provide a protective thermal barrier between the electrode assembly 102 and the battery case 104 at the intersection of the cover 108 and the housing 110 (e.g., at the lip 124) such as during the welding procedure that bonds the cover 108 with the housing 110 to seal the battery case 104.

The insulator 206 is conformable to extend between the electrode assembly 102 the housing 104 when the battery 100 is assembled. The insulator 206 has a first surface 254, a second surface 256, and a terminal edge 258. The insulator 206 includes a body 250 and a profiled portion 252 that extends at a right angle, or substantially right angle, from the body 250. The body 250 of the insulator 206 can extend between the top surface of the top electrode 132x and the inner surface 128 of the cover 108 of the battery case 104. The profiled portion 252 can be positioned over the top and edge of the electrode assembly 102. The profiled portion 252 can be disposed along the perimeter side 120 and adjacent the lip 124. When assembled and fitted within the battery case 104, the profiled portion 252 is disposed to extend away from the cover 108 toward the first side 118. The profiled portion 252 can extend a distance less than "d" of the housing 110.

The profiled portion 252 can be oriented at an angle downward from the cover 108 (e.g., away from the open second side 122 and toward the first side 118) between the lip 124 and the electrode assembly 102. More particularly, the insulator 206 is assembled with a first surface 254 extending over and contacting the top surface of a top electrode 132x and a second surface 256 opposite the first surface 254 disposed to face and be positioned against the inner surface 228 of the cover 108. The insulator 206 can engage with and reposition (e.g., push) the separator 140 covering the electrodes 132 downward and away from the lip 124 such that the separator 140 does not interfere with the welding process sealing the cover 108 with the housing 110. The downward orientation of the profiled portion 252 can engage with and reposition, the separator 140 downward and away from the lip 124 as the insulator 206 is positioned over and a downward force is applied onto the insulator 206 during assembly. The insulator 206 can maximize a distance between the outer edge 142 of the separator 140 encased electrode 132x and the cover 108 and the perimeter side 120 of the housing 110 disposed adjacent the lip 124 within the interior cavity 112 to prevent mechanical and thermal damage during the assembly and sealing of the cover 108 to the housing 110.

The insulator 206 is formed of a sufficiently flexible material that can effectively create a spring-like force against the electrode assembly 102 when force is applied to the insulator 206, such as by the cover 108. The insulator 206 is capable of applying force sufficient force against the separator 140 at the outer edge 142 of at least the top electrode 132x to position, or reposition, the separator 140 to increase a distance from the lip 124. from the weld and preventing thermal damage to the separation 140 and/or impede full contact and sealing between the cover 108 and the housing 110. The insulator 206 has a thickness suitable to withstand weld temperatures exposed to during the welding process of hermetically sealing the cover 108 to the housing 110 and to transfer and apply suitable force onto the separator 140 to cause movement of the separator. In one example, the insulator 206 has a material thickness that is approximately ten times the thickness of the material forming the separator 140. In one example, the profiled portion 252 can be included to be disposed along the interior of the entire perimeter side 120 of the housing 110. In another example, the insulator 206 includes the profiled portion 252 suitable to be disposed along the interior of the perimeter side 120 where the electrode assembly 102 is positioned adjacent to the perimeter side 120 and is not included along sections where the electrode assembly is spaced away from the perimeter side 120, such as at the current collectors 138.

Figure 9:
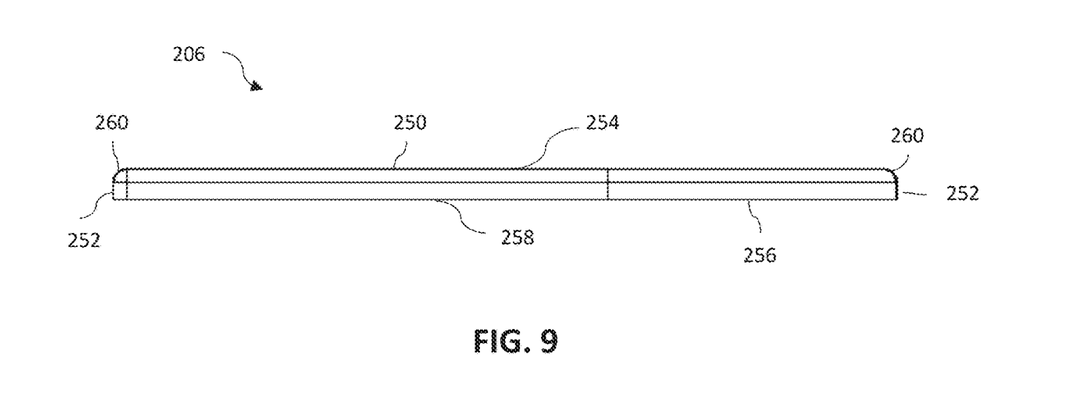
FIG. 9 is a side view of an example insulator useful in the lithium-ion battery of FIG. 7 in accordance with aspects of the present disclosure.
Figure 10:
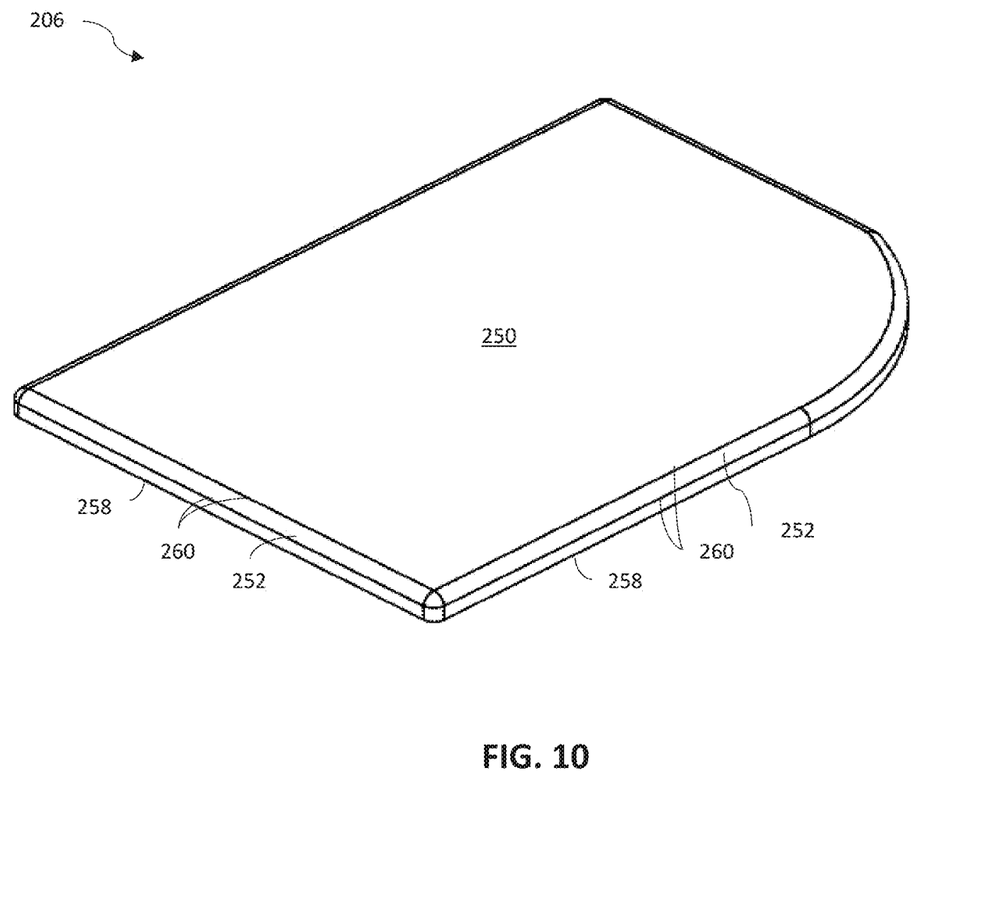
FIG. 10 is a perspective view of an example insulator useful in lithium-ion battery of FIG. 7 in accordance with aspects of the present disclosure.

FIGS. 8-10 illustrate top, side, and profile views of the example insulator 206 useful in the battery 200 in accordance with aspects of the present disclosure. The profiled portion 252 can be disposed at an obtuse angle with respect to the body 250. The profiled portion 252 can be formed to extend at an obtuse angle from the generally planar body 250 along the first surface as indicated with angle, a. The profiled portion 252 is adjoined to the body 250 along a bend edge 260. The bend edge 260 is formed at a distance from the terminal edge 258. The bend edge 260 can be radiused or angular. The profiled portion 252 can extend around an entirety of the body 250 or along select sections or sides of the body 250. The insulator 106 can be formed monolithically of a single sheet of material. The insulator 206 can be formed of a sheet of material shaped into a suitable three-dimensional form. The insulator 206 can be thermo-formed into a suitable shape, for example. The insulator 206 can be maintain a formed shape when freely disposed and flex when sufficient force is applied.

The lithium-ion batteries 100, 200 of the present disclosure can be assembled by inserting the electrode assembly 102 into the housing 110 through the opening at the second side 122 of the battery case 104. The insulator 106, 206 can be assembled within the battery case 104 to extend over the electrode assembly 102. The insulator 106, 206 can be inserted into the battery case 104 in the same manner. The body 150, 250 of the insulator 106, 206 is positioned over the top of the electrode assembly 102 and the profiled portion 152, 252 is positioned to extend between a perimeter, or stack side, of the electrode assembly 102 and the interior surface 114 of the battery case 104. The cover 108 can then be assembled over the insulator 106, 206. The cover 108 is positioned across the open second side 122 over the insulator 106, 206. The cover 108 and the housing 110 can then be hermetically sealed together with the insulator 106, 206 protectively extending between the electrode assembly 102 and the battery case 104 adjacent the seal. The insulator 106, 206 forces the separator 140 extending around the top electrode 132x of the plurality of stacked plate electrodes 132a-x into the interior cavity 112 and away from the lip 124 of the housing 110 by the profiled portion 152, 252 engaging the separator 140 and exerting a downward force on the insulator.

It should be understood that various aspects disclosed herein may be combined in different combinations than the combinations specifically presented in the description and accompanying drawings. It should also be understood that, depending on the example, certain acts or events of any of the processes or methods described herein may be performed in a different sequence, may be added, merged, or left out altogether (e.g., all described acts or events may not be necessary to carry out the techniques). In addition, while certain aspects of this disclosure are described as being performed by a single module or unit for purposes of clarity, it should be understood that the techniques of this disclosure may be performed by a combination of units or modules associated with, for example, a medical device.

Although the present disclosure has been described with reference to preferred embodiments, workers skilled in the art will recognize that changes can be made in form and detail without departing from the spirit and scope of the present disclosure.

What is claimed is:

1. A lithium-ion battery comprising:
   an electrode assembly comprised of a plurality of stacked electrodes;
   a battery case comprising a cover and a housing, the housing including a bottom, a perimeter side, and an open top, the cover configured to extend across the open top, the cover and the housing forming an interior enclosure to house the electrode assembly, the cover and the housing to be sealingly coupled at a lip; and
   an insulator comprising a body and a profiled portion, the body being generally planar and the profiled portion extending from the body at an angle, the body disposed between the electrode assembly and the cover of the battery case, the profiled portion extending between the electrode assembly and the lip of the housing, the insulator to provide a barrier between the electrode assembly and the sealed lip.

2. The lithium-ion battery of claim 1, wherein the profiled portion extends between an edge of at least a top electrode of the plurality of stacked electrodes and the perimeter side of the housing.

3. The lithium-ion battery of claim 1, wherein the insulator comprises a thermoplastic material.

4. The lithium-ion battery of claim 1, wherein the insulator comprises a pre-formable material.

5. The lithium-ion battery of claim 1, wherein the profiled portion terminates at a profile edge, the profile edge disposed between an edge of the electrode assembly and an interior surface of the perimeter side.

6. The lithium-ion battery of claim 1, wherein the profiled portion extends below the lip of the perimeter side of the housing.

7. The lithium-ion battery of claim 1, wherein the profiled portion extends along an entirety of a perimeter edge of the body.

8. The lithium-ion battery of claim 1, wherein the profiled portion extends at an angle of 90 degrees to 135 degrees from the body.

9. A lithium-ion battery comprising:
   an electrode assembly comprising a plurality of electrodes including positive and negative electrodes alternatingly arranged one atop another in a stack, each of the plurality of electrodes being generally planar, each of the plurality of electrodes encased in a separator;
   a battery case comprising a cover and a housing, the housing including a bottom, a perimeter side terminating at a lip, and an open top, the cover configured to extend across the open top and engage with the lip, the cover and the housing forming an enclosure to house the electrode assembly; and
   an insulator comprising a body and a profiled portion, the body being generally planar and the profiled portion extending from the body at an angle, the insulator is assembled within the enclosure of the battery case with the body disposed between the electrode assembly and the cover of the battery case and the profiled portion extending between the electrode assembly and the perimeter side, the insulator to provide a thermal barrier between the electrode assembly and the sealed lip.

10. The lithium-ion battery of claim 9, wherein the profiled portion is configured to extend a distance along the perimeter side less than a height of the perimeter side.

11. The lithium-ion battery of claim 9, wherein the separator extends beyond a perimeter edge of each of the plurality of electrodes, and wherein the separator is flexibly repositionable by the profiled portion.

12. The lithium-ion battery of claim 11, wherein a perimeter edge of the body is adjacently aligned with a perimeter of a top electrode of the plurality of electrodes.

13. The lithium-ion battery of claim 9, wherein the insulator is flexibly responsive to force.

14. The lithium-ion battery of claim 9, wherein the profiled portion extends from the body at a pre-formed obtuse angle to extend toward the bottom of the housing.

* * * * *